Dec. 31, 1963     B. A. WHITEMAN     3,115,705
GAUGES
Filed July 23, 1959     3 Sheets-Sheet 1

INVENTOR
BENTON A. WHITEMAN
BY Ogle R. Singleton
ATTORNEY

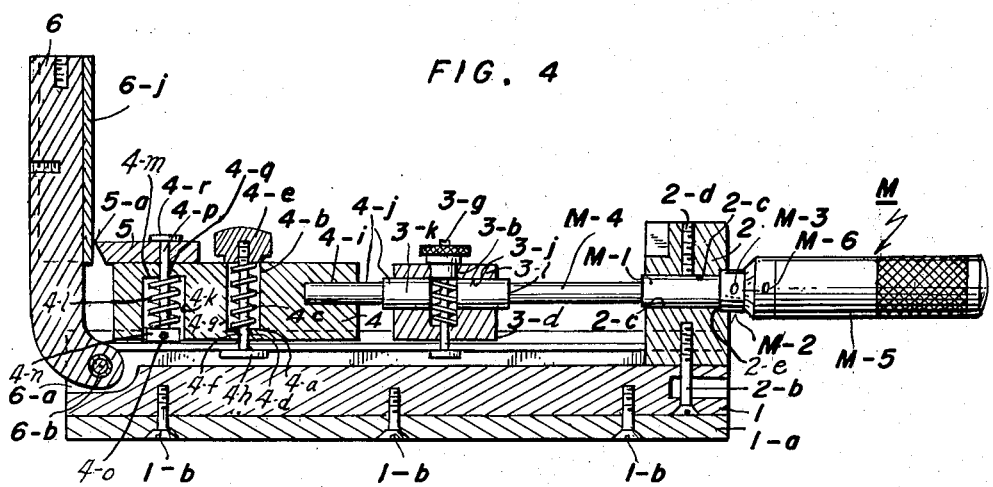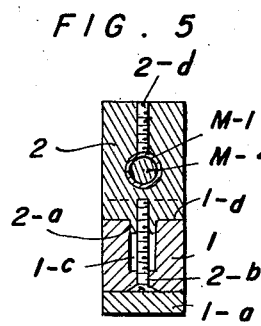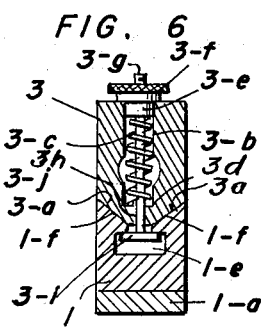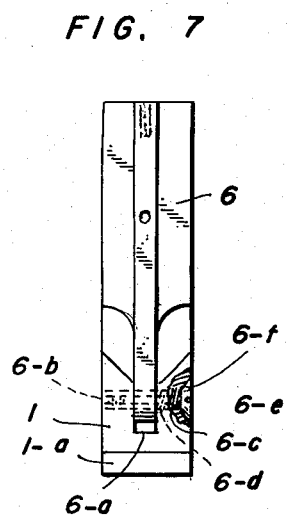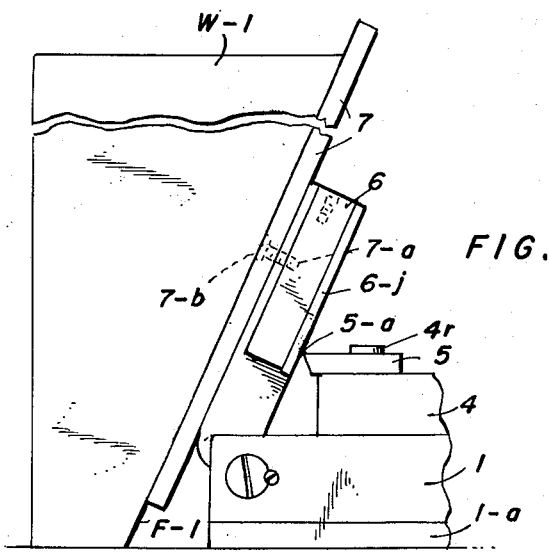

Dec. 31, 1963 B. A. WHITEMAN 3,115,705
GAUGES
Filed July 23, 1959 3 Sheets-Sheet 3
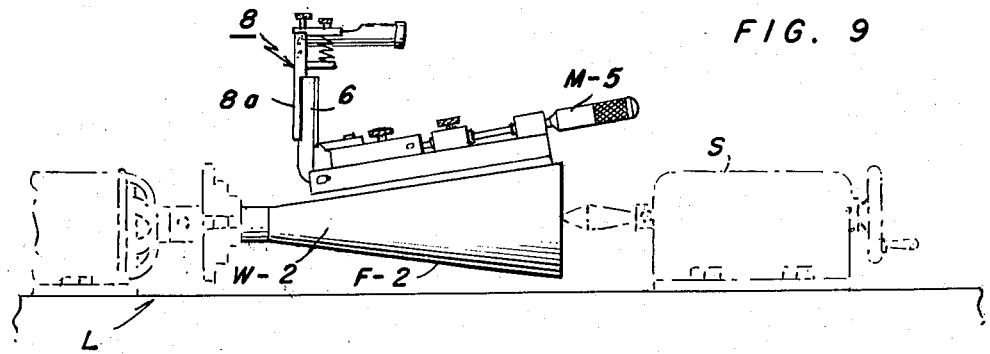
FIG. 9
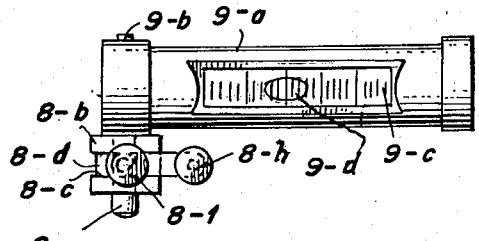
FIG. 10
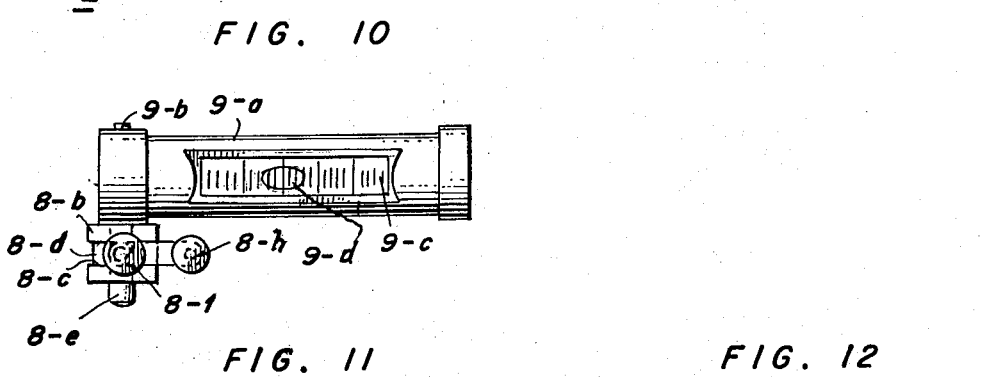
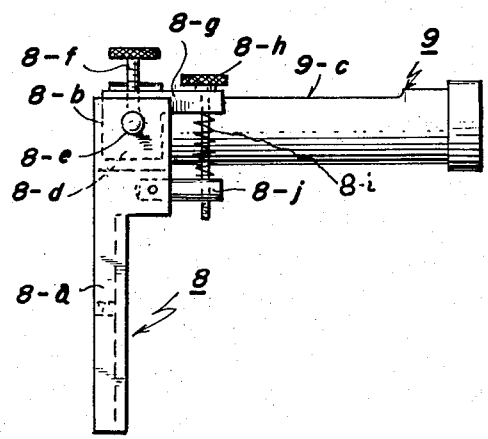
FIG. 11
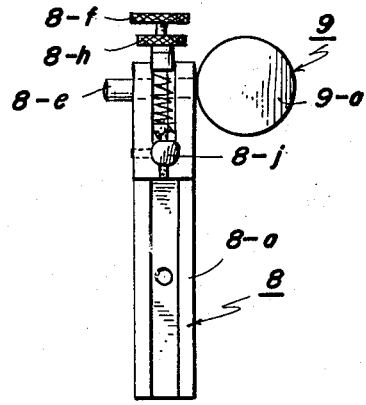
FIG. 12
INVENTOR
BENTON A. WHITEMAN
BY *Ogle B. Singleton*
ATTORNEY

United States Patent Office 3,115,705
Patented Dec. 31, 1963

3,115,705
GAUGES
Benton Adair Whiteman, Henrico County, Va.
(3000 Dumbarton Road, Richmond, Va.)
Filed July 23, 1959, Ser. No. 829,005
1 Claim. (Cl. 33—75)

My invention consists in a new and useful improvement in gauges, and is designed to provide a precision tool for measuring angles of taper faces of work pieces, by precisely measuring tangent quantities of inclinations, having precise angular equivalents.

The essential parts of my device are (1) a body having a plane base, (2) a radial arm pivotally mounted on one end of the body, and comprising a tangent bar, and (3) a micrometer mounted on the body, and adapted to accurately measure the precise tangent quantities of the angles of inclination of the arm relative the body.

My device is provided with means for biasing the arm to bear against the stem of the micrometer, and also with a blade removably mounted on the arm for use when measuring angles of more extensive faces.

I also provide a spirit-level bracket removably mounted on the arm, and adapted to establish a datum line, for measuring angles when the body cannot be disposed horizontally.

While I illustrate in the drawings and hereinafter fully describe one specific embodiment of my invention, it is to be distinctly understood that I do not consider my invention to be limited to said specific embodiment but refer for the scope of my invention to the claim appended hereto.

In the drawings:

FIG. 4 is a longitudinal, vertical section on the line 4—4 of FIG. 1, in the direction of the arrows.

FIG. 5 is a transverse, vertical section on the line 5—5 of FIG. 2, in the direction of the arrows.

FIG. 6 is a transverse, vertical section on the line 6—6 of FIG. 2, in the direction of the arrows.

FIG. 7 is an end elevation of the left end shown in FIGS. 1, 2 and 3, parts being broken away.

FIG. 8 is a detail showing the blade mounted on the device.

FIG. 9 is a side elevation, showing the device carrying the spirit-level bracket, applied to a work piece mounted in a lathe shown in broken lines.

FIG. 10 is a top plan of the spirit-level bracket.

FIG. 11 is a side elevation of the spirit-level bracket.

FIG. 12 is an end elevation of the spirit-level bracket.

Figure 1:
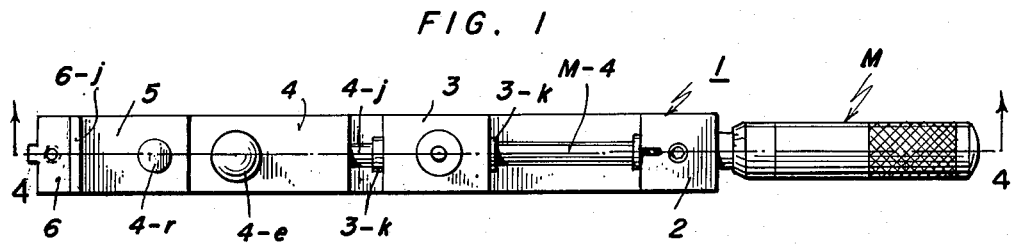
FIG. 1 is a top plan of my device.

As shown in the drawings, my device has a body 1 with a hardened, plane base 1–a removably attached thereto by machine screws 1–b. The body 1 (FIG. 5) has a slot 1–c in its upper face 1–d at its right end as viewed in FIGS. 1–4. A block 2 is removably mounted on said face 1–d with a tongue 2–a seated in the slot 1–c. A bolt 2–b passes through the body 1 and the slot 1–c and is threaded in the block 2 (FIG. 5). The block 2 carries a micrometer M of the usual type (FIG. 4). In a longitudinal bore 2–c of the block 2, there is mounted the cylindrical bushing M–1 of the micrometer M, and fixed in the block 2 by a bolt 2–d. A tube M–2 projects from the bushing M–1, is seated against a shoulder 2–e of the bore 2–c, and is provided with the usual micrometer scale M–3. Threaded in the tube M–2 there is a cylindrical, micrometer measuring stem M–4 with a sleeve M–5 carrying a scale M–6 co-acting with the scale M–13 (FIG. 4).

The body 1 has a T-slot 1–e (FIG. 6) in its upper face 1–d, extending from the slot 1–c to the left end of the face 1–d. The upper side of the slot 1–e has divergent faces to form a V-shaped trackway 1–f.

A spacer block 3 (FIGS. 1–4 and 6) has convergent lower faces 3–a for slidably mounting the block 3 on said trackway 1–f, and a vertical bore 3–b provided with an expansion spring 3–c confined between a shoulder 3–d at the bottom of the bore 3–b and a sleeve 3–e on a nut 3–f threaded on a bolt 3–g passed through a bore 3–h extending downwardly from the bore 3–b, and carrying a T-head 3–i.

It is to be understood that the T-head 3–i of the bolt 3–g is so dimensioned that when it is in the position shown in FIG. 6 it serves to fasten the block 3 on the body 1, and that when it is turned 90° it can pass out of the T-slot 1–e to release the block 3 for removal from the body 1.

The block 3 has a horizontal, longitudinal bore 3–j (FIG. 4) in which is mounted a cylinder 3–k having accurately machined end faces 3–l. Obviously, said bore 3–b passes through the cylinder 3–k.

It is to be observed (FIGS. 1–4) that the stem M–4 of the micrometer M and the cylinder 3–k are co-axial.

A block 4 has lower convergent faces 4–a for slidably mounting the block 4 on said trackway 1–f (FIG. 4), and a vertical bore 4–b provided with an expansion spring 4–c confined between a shoulder 4–d at the bottom of the bore 4–b and a nut 4–e threaded on a bolt 4–f passed through a bore 4–g extending downwardly from the bore 4–b and carrying a T-head 4–h.

It is to be understood that the T-head 4–h of the bolt 4–f is so dimensioned that when it is disposed in the T-slot 1–e it serves to fasten the block 4 on the body 1.

The block 4 has a horizontal bore 4–i in its end adjacent said block 3, in which is removably mounted a cylinder 4–j having an accurately machined face.

It is to be observed (FIGS. 1–4) that the cylinder 4–j is co-axial with said cylinder 3–k and stem M–4.

The block 4 has a vertical bore 4–k provided with an expansion spring 4–l confined between a shoulder 4–m at the upper end of the bore 4–k and a collar 4–n removably mounted by a pin 4–o on a bolt 4–p passed upwardly through a bore 4–q opening through the top of the block 4.

A hardened swivel block 5 is mounted on the block 4 by the bolt 4–p passing loosely therethrough and having a head 4–r bearing on the block 5. The block 5 has a knife-edge 5–a.

A radial arm 6 (FIG. 7) is pivotally mounted, adjacent block 5, in a slot 6–a extending downwardly from the T-slot of the base 1, by a pintle 6–b about which is coiled a coil spring 6–c having one end 6–d attached to said arm 6 and its other end 6–e attached to a head 6–f on said pintle 6–b. The head 6–f (FIGS. 2 and 3) has a transverse slot 6–g by which the pintle 6–b, journaled on the body 1, can be rotated by a suitable tool, and an arcuate recess 6–h on its periphery. A lock bolt 6–i is threaded in body 1 for fastening head 6–f when the pintle 6–b has been rotated to bring the recess 6–h into proper relation with the bolt 6–i to position said pintle 6–b to tension the spring 6–c.

It is to be understood that when the spring 6–c has been thus tensioned the arm 6 is biased to press its hardened face plate 6–j against the knife edge 5–a of the block 5.

The purpose of the spacer block 3 is to increase the capacity of my device. It is exactly one inch in length. With the spacer block 3 on the body 1, the device has a capacity of 45°. With the block 3 removed from the body 1, the device will measure angles in the vicinity of 60°. In other words, if an angle of more than 45° is to be measured, the spacer block 3 is removed, allowing the radial arm 6 more swing to match the angle. The tangent reading with the block 3 removed will be one inch plus the micrometer reading.

Figure 2:
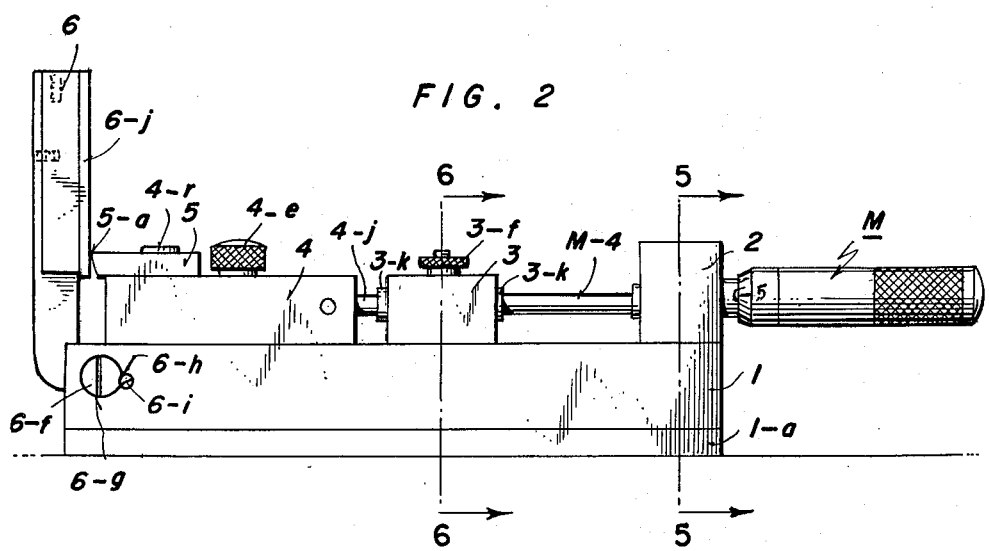
FIG. 2 is a side elevation, the parts being in position to zero the micrometer before use.
Figure 3:
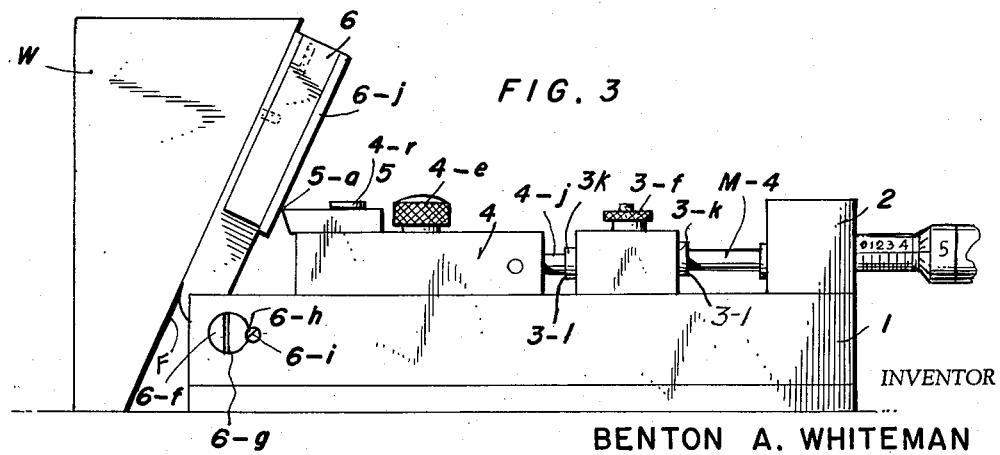
FIG. 3 is a view similar to FIG. 2, showing the device applied to a work piece, the parts being in position to measure the angle of the face of the work piece.

FIG. 8 illustrates the use of my device to measure the angle of the face F–1 of a work piece W–1 which is of considerable greater length than the face F of the work piece W (FIGS. 2 and 3). For this purpose, a blade 7 is mounted on the radial arm 6 by a bolt 7–a having a counter-sunk head 7–b, whereby the plane surface of the arm 6 is extended when desired.

FIGS. 9–12 illustrate the novel form of spirit-level bracket for use in my device.

The bracket 8 has a leg 8–a which can be mounted on the radial arm 6 of the device (FIG. 9) in the same way as the blade 7 above described. A head 8–b of the bracket 8 has at its top a slot 8–c (FIG. 10) in which is loosely mounted a block 8–d carried by a shaft 8–e journaled in the head 8–b. A binding post 8–f is threaded in said block 8–d and engages the shaft 8–e. The block 8–d has a slotted arm 8–g through which passes a binding post 8–h carrying an expansion spring 8–i confined between the arm 8–g and an arm 8–j removably mounted in the head 8–b. The post 8–h passes loosely through the slotted arm 8–g and the spring 8–i and is threaded in the arm 8–j.

The spirit-level 9 has a case 9–a which is threaded on the shaft 8–e. The case 9–a has a threaded bore 9–b passing completely therethrough so that the case 9–a can be mounted on the shaft 8–e, alternatively in the position shown in FIG. 10, extending to the right of the shaft 8–e, and in the reverse position extending to the left of the shaft 8–e, the viewing glass 9–c being on top for inspection in both positions.

It is to be understood that the binding post 8–f serves for rough adjustment of the spirit-level 9 on the block 8–d, and that the binding post 8–h adapted to rock the block 8–d when the shaft 8–e is fixed therein, serves for fine adjustment of the spirit-level 9.

Having described the structural details of my improved device, I will now describe its use and operation.

The parts being adjusted as shown in FIGS. 1 and 2, the micrometer M is zeroed and the radial arm 6 is disposed at a 90° angle relative the body 1. To determine the angle of the face F of the work piece W (FIG. 3), the sleeve M–5 of the micrometer M is rotated to withdraw the measuring stem M–4 to its position shown in FIG. 3. The nut 3–f of the block 3 and the nut 4–e of the block 4 having been loosened, the blocks 3 and 4 are free to slide on the body 1 under pressure of the spring 6–c of the radial arm 6, following the withdrawn stem M–4. When this movement has caused the arm 6 to assume the position relative the body 1 shown in FIG. 3, so that the arm 6 engages the face F of the work piece W, the micrometer M indicates the precise measurement of the degree of movement of the arm 6 relative the body 1.

As shown in FIG. 3, the micrometer M indicates a tangent .480″, showing that the inclination of the radial arm 6, coinciding with the face F of the work piece W, is an angle of 25° 39′.

FIG. 9 illustrates the use of my device when the spirit-level bracket 8 is mounted on the radial arm 6. My device is thus conditioned for measuring angles of work pieces which are so positioned, as work piece W–2 mounted in the lathe L (FIG. 9), as to make it impossible to dispose the body 1 of the device in a horizontal position when measuring the angles as shown in FIGS. 2 and 3.

By using the bracket 8, the spirit-level 9 can be utilized to establish a datum line from which to measure the angle.

This is done in the following manner:

The plane base 1–a of the body 1 of the device is placed upon any suitable horizontal plane surface, such as the surface S of the lathe L, and the micrometer M is zeroed, the radial arm 6 being disposed at a 90° angle relative the body 1. The spirit-level 9 is roughly adjusted horizontally by the binding post 8–f. When the binding post 8–f tightly engages the shaft 8–e fixing it firmly in the block 8–d, the block 8–d is rotated in the head 8–b by the arm 8–g moved by the binding post 8–h, thereby finely adjusting the spirit-level 9 to precisely center the bubble 9–d in the viewing glass 9–c, thereby indicating that the longitudinal axis of the spirit-level 9 is precisely normal to the vertical axis of the radial arm 6, parallel with the surface S, and consequently horizontal, thus establishing the desired datum line.

The body 1 is then so mounted upon the work piece W–2 as to engage the face F–2, the bubble 9–d being thereby thrown off center. The sleeve M–5 of the micrometer M is then rotated to cause the radial arm 6 to move, as above described, to assume the position relative the body 1 shown in FIG. 9. When the arm 6 has moved sufficiently to cause the bubble 9–d to be again centered, the micrometer indicates the precise measurement of the degree of movement of the arm 6 relative the body 1.

As shown in FIG. 9, the micrometer M indicates a tangent .173″ or an angle of 9°49′, showing that the inclination of the body 1, coinciding with the face F–2 of the work piece W–2, is two times 9°49′ or 19°38′.

Having described my invention, what I claim is:

In an attachment for a gauge for measuring the angle of a taper of a work piece, adapted to determine a datum line from which to measure said angle, the combination of a bracket having means adapted to removably mount said bracket on the gauge, said bracket having a head having a slot therein; a block loosely mounted in said slot; a shaft journaled in said head and passing through said block; a binding post threaded in said block and engaging said shaft; a slotted arm on said block; an arm mounted on said bracket and aligned vertically with said slotted arm; a second binding post passed loosely through said slotted arm and threaded in said bracket arm; an expansion spring about said second binding post and confined between said slotted arm and said bracket arm; a casing threaded on said shaft and capable of rotation about the shaft through 360°; and a spirit level in said casing, the parts being so designed and related that said binding post threaded in said block and said second binding post are adapted to adjust said spirit-level to determine said datum line.

References Cited in the file of this patent

UNITED STATES PATENTS

| | | |
|---|---|---|
| 964,199 | Bergh | July 12, 1910 |
| 1,498,896 | Van de Veire | June 24, 1924 |
| 2,056,948 | Bensen | Oct. 13, 1936 |
| 2,221,088 | Gardner | Nov. 12, 1940 |
| 2,413,841 | Minuto | Jan. 7, 1947 |
| 2,541,641 | Dodson | Feb. 13, 1951 |
| 2,645,026 | Trbojevich | July 14, 1953 |
| 2,669,027 | Wilson | Feb. 16, 1954 |
| 2,918,726 | Klabunde | Dec. 29, 1959 |

FOREIGN PATENTS

| | | |
|---|---|---|
| 145,638 | Germany | Oct. 31, 1903 |